Nov. 28, 1967  W. T. GLOOR  3,354,704
TENSILE, COMPRESSION, AND FLEXURE TESTING MACHINE
Filed Sept. 13, 1965  3 Sheets-Sheet 1

INVENTOR.
Wilbur T. Gloor
BY
ATTORNEYS.

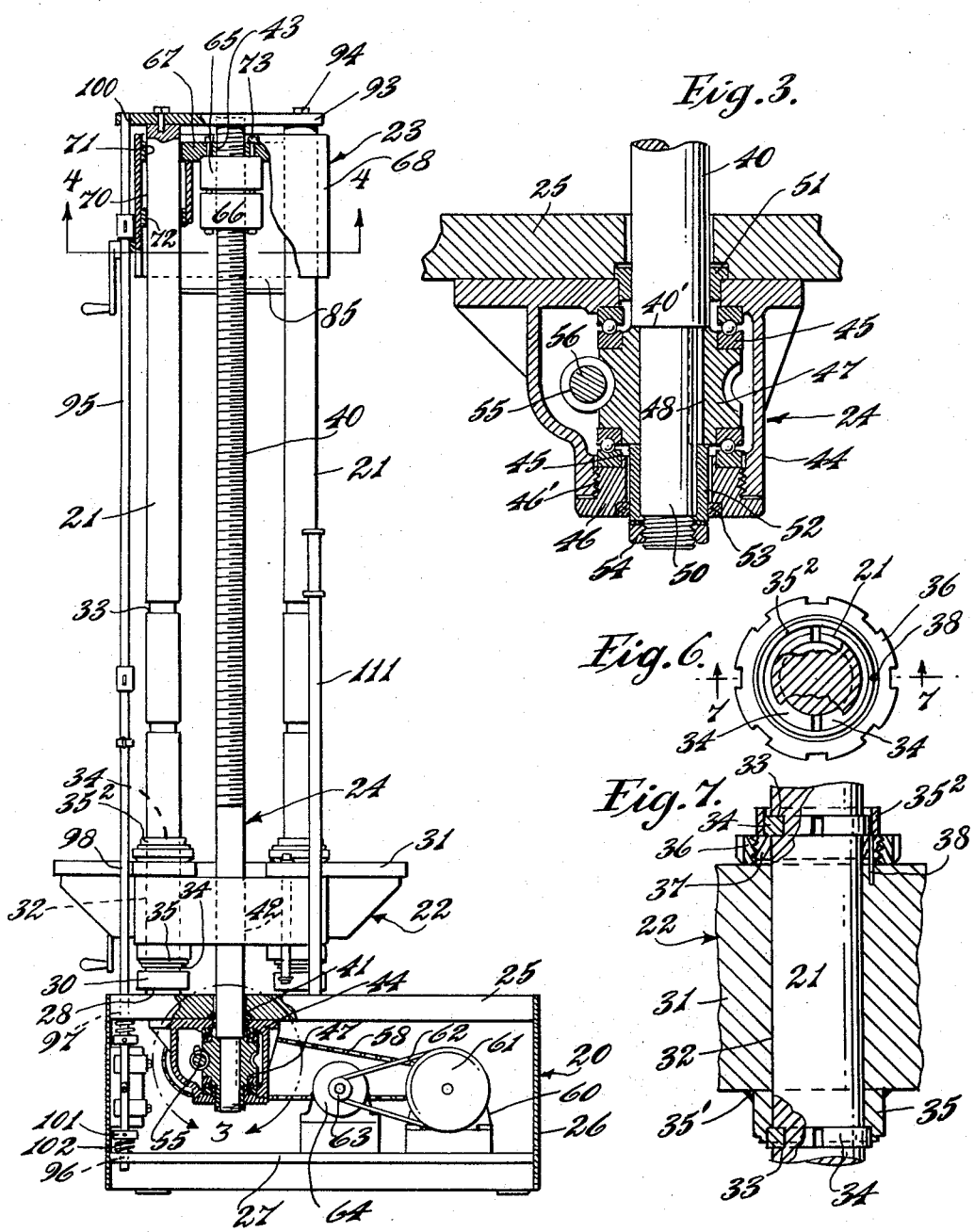

Nov. 28, 1967   W. T. GLOOR   3,354,704
TENSILE, COMPRESSION, AND FLEXURE TESTING MACHINE
Filed Sept. 13, 1965   3 Sheets-Sheet 3

INVENTOR.
Wilbur T. Gloor
BY
ATTORNEYS.

United States Patent Office 3,354,704
Patented Nov. 28, 1967

3,354,704
TENSILE, COMPRESSION, AND FLEXURE
TESTING MACHINE
Wilbur T. Gloor, Berwyn, Pa., assignor to The Warner
& Swasey Company, Cleveland, Ohio, a corporation of
Ohio
Filed Sept. 13, 1965, Ser. No. 486,906
6 Claims. (Cl. 73—93)

ABSTRACT OF THE DISCLOSURE

The testing machine of the invention has columns cantilevered from a base, with a sliding crosshead guided by the columns. Screw means move the crosshead vertically. Since the columns are free of cross-connection at their upper ends, skew loads on the crosshead are compensated for by separate deflections of the columns, and thus binding between the columns and crosshead is avoided.

---

The present invention relates to testing machines for testing specimens under tension, compression and flexure.

A purpose of the invention is to provide more effective guiding of a moving head of a testing machine under off-center or skew loading.

A further purpose is to eliminate the need for a fixed platen or head at the end of the machine remote from that at which the drive is located.

A further purpose is to mount parallel guiding columns on a base plate at one end, suitably the bottom of the machine, to secure a table on the guiding columns, to guide a crosshead on the columns at the side of the table remote from the base plate, to load a specimen between the table and the crosshead, and to bear the longitudinal test load in the machine on the columns between the table and the base plate, while the columns beyond the table are subjected only to lateral force components which are developed in off-center loading.

A further purpose is to provide abutments on the guiding columns which permit adjustable positioning of the table at various positions along the columns.

A further purpose is to locate the columns symmetrically at corners of the base plate and to provide loading screws operating from the base plate between each pair of columns at the ends.

A further purpose is to lock a table with respect to a guiding column by providing an annular slot in the guiding column, positioning split rings in the annular slot extending radially beyond the outside of the guiding column, extending the guiding column through an opening in the table, interposing between the split rings and the table an externally threaded nut surrounding the guiding column, keying the externally threaded nut to the table to prevent it from rotating, and surrounding the externally threaded nut with an internally threaded nut cooperating therewith and in tightened position engaging the table and causing the externally threaded nut to engage the split rings.

Further purposes appear in the specification and in the claims.

In the drawings I have chosen to illustrate one only of the numerous embodiments in which the invention may appear, selecting the form shown from the standpoints of convenience in illustration, satisfactory operation, and clear demonstration of the principles involved.

FIGURE 2 is an end elevation of the testing machine of the invention, partially broken away to show interior features.

FIGURE 3 is an enlarged fragment of FIGURE 2, illustrating the drive for the screws.

FIGURE 6 is an enlarged section on the line 6—6 of FIGURE 1.

FIGURE 7 is a section on the line 7—7 of FIGURE 6.

Figures 1, 4, 5:
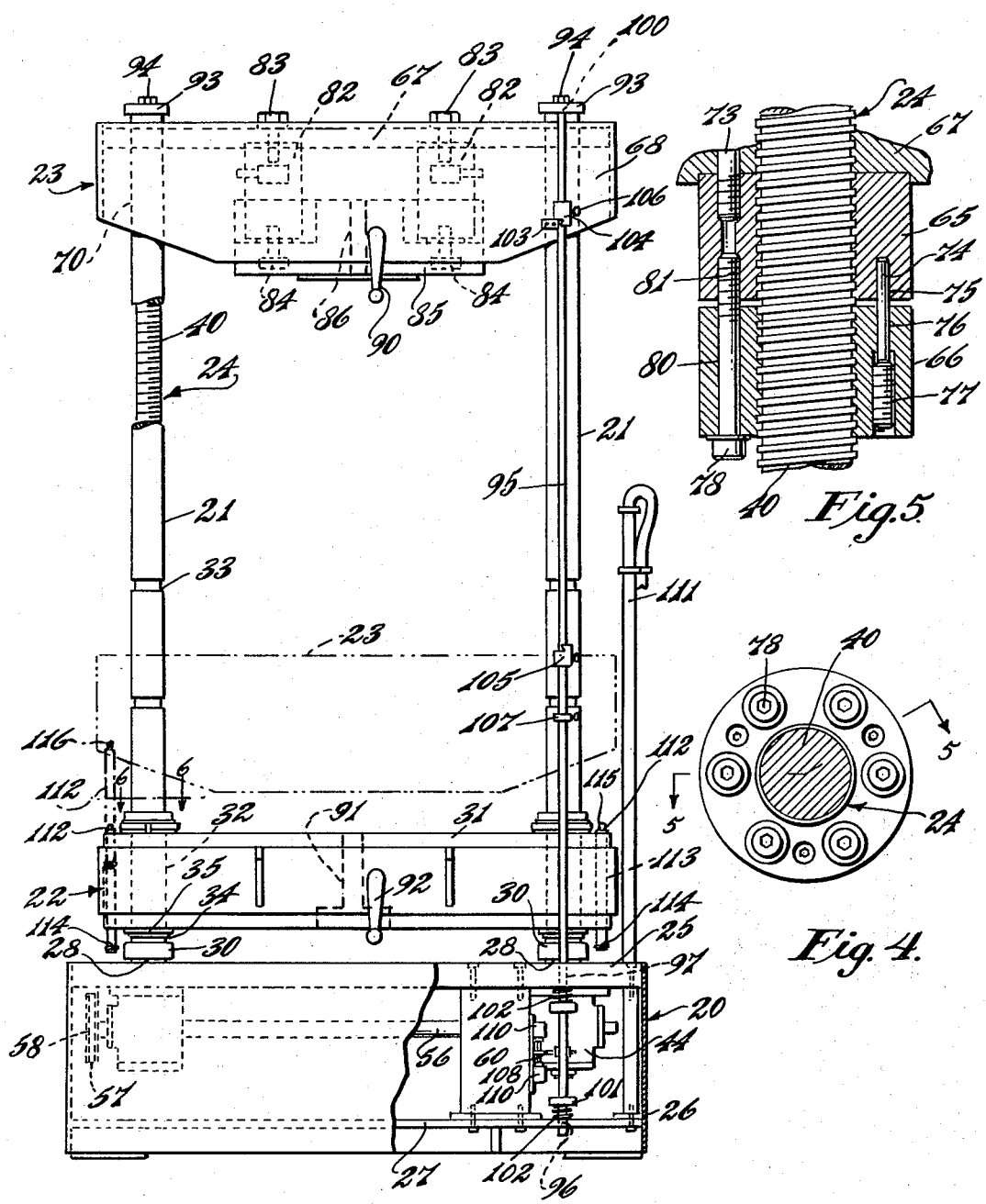
FIGURE 1 is a side elevation of a testing machine of the invention, partially broken away to show the interior.
FIGURE 4 is an enlarged section on the line 4—4 of FIGURE 2 illustrating one of the screws and nuts.
FIGURE 5 is a section on the line 5—5 of FIGURE 4.

In the design of testing machines, of the character of tensile testing, compression testing and flexural testing machines, considerable difficulty may be presented by off-center or skew loading which results either from the placing of a symmetrical specimen to one side of the axis, or from testing of an unsymmetrical specimen under conditions in which lateral moments are created. One solution to the problem is to provide top and bottom platens, with intermediate guide columns on which the moving head slides. This solution, however, is expensive in that it requires the presence of adequately rigid top and bottom members which connect to the columns. Furthermore, a vertical testing machine of this design has a relatively high center of gravity, requires correspondingly increased head room, and, where the longitudinal load is transmitted through the full length of the columns, requires relatively large column sections.

The present invention is concerned with the manufacture of a lighter and less costly testing machine of this character, in which the guiding columns are made to perform different functions in different portions of their lengths. The columns are secured at one end to a base plate, so-called because it transmits load between the loading screws and the columns. A table is mounted on the columns, preferably in adjustable position, but for a particular adjusted position functions as a stationary head. Moving on and guided by the columns at the end opposite from the base plate, there is a crosshead which functions as the other testing machine head. Screws apply load to the crosshead, from a drive and bearings mounted on the base plate.

In tensile testing the screws are loaded in compression, and they transmit tension load to the specimen by nuts, the crosshead, load measuring means, a grip adapter and a grip. Load from the screws is transmitted at the other end through the base plate to the guiding columns which are in tension, to the table and to the opposite grip.

Any lateral components from off-center loading are borne by the portion of the guiding columns which extend beyond the table and which are not subjected to axial load.

If the specimen is loaded in compression, the screws are loaded in tension. They transmit their load through the nuts, the crosshead, the load measuring means, the grip adapter and the grip to one end of the specimen. At the other end of the specimen the screws transmit their load through the base plate, through the portions of the guiding columns between the base plate and the table, acting in compression, and then through the table and the grip to the opposite end of the specimen. Again the portions of the guiding columns between the table and the crosshead bear only lateral force components from off-centering loading.

Considering now the drawings in detail, the testing machine of the invention comprises a base plate assembly 20, in this case at the bottom, guiding columns 21, a table assembly 22, a crosshead assembly 23, and a loading assembly 24.

The base plate assembly 20 comprises a base plate 25 which is sufficiently strong and rigid to transmit the load, and a housing 26 extending below the base plate 25 and braced by a bottom plate 27 parallel to the base plate. The housing effectively acts as a base for the testing machine of the invention which preferably stands vertically.

At suitable points, conveniently at positions opposite the corners of the base plate, there are provided column anchorages 28 secured to the intermediate plate, desirably having circular horizontal cross section and receiving in abutting relationship parallel vertical guiding columns 21 resting on the abutments 28. The columns are flanged on the bottom and are held firmly in parallel vertical position by collars 30 suitably engaging the flanges and bolted to the base plate 25.

Positioned parallel to the base plate and conveniently spaced above it is the table assembly 22 consisting of a firm and rigid table 31 which has an extent greater than the space between the columns and is provided with a central grip opening 91 and column openings 32 at the corners through which the columns extend. The columns at a plurality of positions along their length have pairs of grooves forming abutments 33. As shown in FIGURES 6 and 7, split rings 34 occupy the grooves immediately below the table and extend out radially from them far enough to interfere with and block downward motion of the table, the split rings being surrounded and held by a retaining ring 35 suitably fastened as by welding at 35' to the bottom of the table 31. Above the table the groove forming abutments 33 is occupied by corresponding split rings 34 held by a surrounding retaining ring 35$^2$.

In order to tighten the table in one position, a surrounding nut 36 operated by a spanner wrench and threading into a cooperating surrounding nut 37 held by a pin 38 against turning, acts like a jackscrew in applying force axially between the table and the upper split rings to anchor the table in a particular position.

Between the two columns 21 at each opposite end of the machine and parallel to the columns is placed a loading screw 40 which extends through an adequate opening 41 in the base plate, through an adequate opening 42 in the table and through an adequate opening 43 in the crosshead assembly, all of these openings providing clearance.

Secured to the bottom of the base plate is a bearing and drive housing 44, best seen in FIGURE 3, which mounts upper and lower anti-friction thrust bearings 45 compressed by a bottom plate 46 threaded at 46' into the housing and journalling for thrust and journal bearing purposes a worm wheel 47 keyed at 48 on a reduced portion 50 at the bottom of the screw 40. An auxiliary journal bearing is provided at 51 in the upper portion between the screw and the housing as well as the base plate. The worm wheel 47 is held on the screw against its shoulder 40' by spacer sleeve 52 compressed by nut 54 threaded on the bottom of the screw. Oil seal 53 prevents loss of lubricant.

The two loading screws 40 are held in synchronism in any suitable manner, here shown as worms 55 on a worm shaft 56 suitably journaled in the housings and extending between opposite ends of the machine as shown in FIGURE 1, the worm shaft being driven by sprocket 57 and chain 58 from speed reducer 60 provided with a cooperating sprocket not shown, and driven by pulley 61 and belt 62 from pulley 63 on electric motor 64.

At the upper ends threaded on the drive screws 40 are upper and lower nuts 65 and 66 (FIGURES 4 and 5). The crosshead assembly 23 includes a crosshead plate 67 generally parallel to the table, a crosshead housing 68 extending downward, and guiding openings 70 surrounding the guiding columns. At upper and lower positions in the guiding openings are sliding bearings 71 and 72 capable of withstanding considerable lateral moments and long enough to bridge the various anchorage grooves for the table.

Upper nuts 65, best seen in FIGURES 2 and 5, are anchored to the crosshead plate by longitudinally extending bolts 73.

The lower nuts 66 are adjustable to take up backlash in the screw. As best seen in FIGURES 4 and 5 they are angularly adjustable and are held in angularly adjustable position by pins 74 extending into openings 75 in the upper nuts and passing through cooperating openings 76 in the lower nuts 65 and held by a threaded lock screw 77, in the lower nuts. The upper and lower nuts are then urged toward one another in the adjusted position by bolts 78 extending through openings 80 in the lower nuts and threaded at 81 into the upper nuts. When properly positioned the nut assembly is locked by tightening lock screws 77 to lock pins 74 in its seat.

Thus any load applied to the loading screws is transmitted to the crosshead plate 67.

Figure 8:
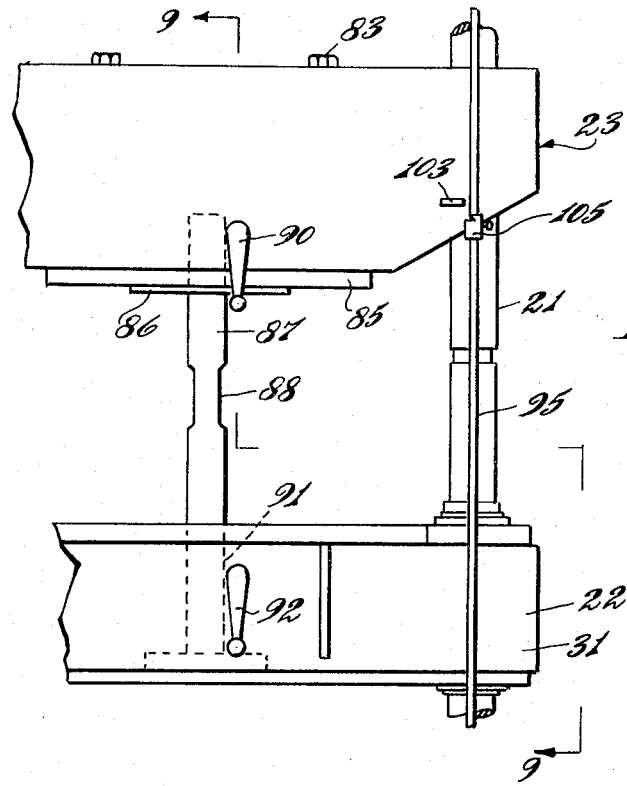
FIGURE 8 is a fragmentary side elevation corresponding to a portion of FIGURE 1, showing a test specimen in place in the testing machine.
Figure 9:
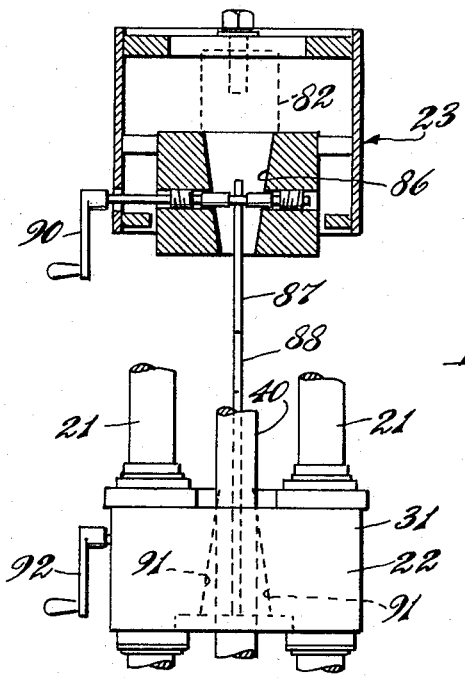
FIGURE 9 is a section on the line 9—9 of FIGURE 8, omitting the grip and merely placing the load cells for convenience in illustration.

Positioned suitably at spaced points in the crosshead, are load cells 82 which may be strain gage load cells of the character of Baldwin SR 4 load cells as well known in the art, and these are anchored at one end to the crosshead by bolts 83 and at the other end they are anchored by bolts 84 to a grip adapter 85 well known in the art which receives a grip 86, also well known, and holds the upper end of a test specimen 87 having a gage portion 88 (FIGURES 8 and 9).

The grip may be operated by a suitable handle 90, forming no part of the present invention, which as well known can engage or release grip 86. The grip has been omitted in FIGURE 9 to permit showing the end of the test specimen.

The table itself has a cooperating grip 91 of any well known type operated for example by handle 92 and engaging the lower end of the test specimen 87.

In order to guide the loading screw 40 at its upper end and to laterally position the two guiding columns 21 at each end of the machine, the guiding columns are interconnected by a bar 93 secured to the columns by bolts 94 and providing a bearing for the loading screw. A control rod 95 is slidable vertically of the machine, passing through opening 96 in the bottom plate 27 and opening 97 in the base plate, passing through a corner recess at 98 in the table and in front of the crosshead, to be guided at the top in a recess 100 in one of the top bars 93.

Spring abutments 101 on the control rod provide anchorages for helical compression springs 102 urging the rod to normal intermediate position against the bottom plate 27 and the intermediate plate 25. The crosshead has a dog 103 which in upper and lower positions can deflect the control rod by engaging adjustable stops 104 and 105 surrounding the control rod and adjusted by set screws 106. There is also a limit stop 107 in case the stop 105 should become loose. When the crosshead in upper or lower positions engages either of the stops and displaces the control rod it moves an actuator 108 to trip one of the limit switches 110 at opposite ends to cut-off electrical power from the motor. Electric lead-in is provided at 111.

In order to raise the table, lifting rods 112 are provided at suitable points in the table passing through vertical openings 113 in the table and having bottom flanges 114 which prevent them from rising too far. The lifting rods can be raised and threaded at 115 into sockets 116 in the crosshead when it is desired to interconnect the crosshead to the table for the purpose of raising or lowering the table.

In operation of the device of the invention, once the table is properly adjusted, with the grips in place, it is merely necessary to adjust the crosshead position, insert the specimen, tighten the grips, and then if a tension test is to be run, move the crosshead away from the table. If a compression test is to be run, the grips will normally be replaced by compression heads as well known in the art, and the screws driven in the direction to move the crosshead toward the table. For a flexure test modified grips as well known in the art are used. As the load is applied, the only portions of the guiding columns which are in either longitudinal compression or tension are the portions between the base plate and the table. The portions of the guiding columns between the table and the crosshead merely function to absorb lateral force components incident to off-center loading.

The load cells are of course electrically connected to an indicator and recorder, and thus the loading can be determined.

In order to change the position of the table, spanner nuts 36 are released, suitably about a half turn, retaining rings $35^2$ above the table are lifted and upper split rings 34 are removed radially.

Thus it will be evident that as the internally threaded spanner nuts 36 are loosened the externally threaded nuts 37 do not turn because they are keyed at 38 to the table 24, but the endwise pressure of the externally threaded nuts 37 on the split rings is released so that the split rings can be taken out when the retaining rings $35^2$ are removed.

The crosshead is then lowered to a position close above the table as shown in dot-and-dash lines in FIGURE 1, and the lifting rods 112 are raised and threaded into the sockets 116 so that the table can be raised. The table is then raised far enough to permit the lower retaining rings 35 to uncover the lower split rings 34, and the lower split rings are removed radially. The table is then raised or lowered to a position slightly above the desired new position, and the lower split rings 34 are reinserted in the grooves forming the abutments 33 at the proper new position. Then the table is lowered until the lower retaining rings 35 surround and hold the lower split rings 34 in place. Then the upper split rings 34 are inserted in the grooves forming the abutments 33 above the table and the upper retaining rings $35^2$ are placed in position surrounding the upper split rings 34. Then by adjusting the spanner nuts 36 axial force is applied to the upper and lower split rings to anchor the table.

In view of my invention and disclosure variations and modifications to meet individual whim or particular need will doubtless become evident to others skilled in the art, to obtain all or part of the benefits of my invention without copying the structure shown, and I therefore claim all such insofar as they fall within the reasonable spirit and scope of my claims.

Having thus described my invention, what I claim as new and desire to secure by Letters Patent is:

1. In a testing machine, a base plate, parallel guiding columns on each side secured to the base plate at spaced lateral positions and extending perpendicularly thereto, the guiding columns being free from stationary connection with one another across the machine at ends remote from the intermediate plate, a table secured to the guiding columns parallel to the base plate, a crosshead parallel to the table and guided on the guiding columns in a sliding relationship at a position in spaced relation from the table and on the opposite side of the table from the base plate, means including screws extending parallel to the guiding columns for moving the crosshead with respect to the table to apply load to a specimen, means for securing one end of the specimen to the table, and means including a force measuring system for securing the other end of the specimen to the crosshead, whereby the guiding columns between the table and the base plate transmit the longitudinal test load and the guiding columns beyond the table in the direction of the crosshead perform a guiding function by resisting force components due to off-center loading.

2. In a testing machine, a base plate, guiding columns parallel to one another extending perpendicularly from the base plate, located at opposite corners of the base plate and secured to the base plate near their ends, the guiding columns at their ends remote from the base plate being free from stationary cross connection between opposite ends, a table spaced from the base plate and parallel thereto, having openings through which the guiding columns pass, a plurality of anchorage abutments at various positions along the guiding columns, attachment means for the table slidably engaging different abutments along the guiding columns for adjusting the position of the table, screws extending parallel to the guiding columns at opposite ends of the base plate, means acting from the base plate for journalling and driving the screws, nuts on the screws, a crosshead located in spaced relation to the table, parallel to the table on the side of the table remote from the base plate and having openings through which the guiding columns pass, guide means for guiding the crosshead on the guiding columns, means for securing the nuts to the crosshead, and means including a load measuring device for gripping opposite ends of the specimen and securing it respectively to the table and to the crosshead.

3. In a testing machine for testing a specimen, a base plate, a plurality of laterally spaced parallel guiding columns secured near one end to the base plate and extending transversely thereto, the guiding columns being free from stationary connection from opposite ends of the machine at their ends remote from the base plate, a table extending transversely to the guiding columns and having openings through which the guiding columns pass, means for securing the guiding columns to the table, first grip means for one end of the specimen secured to the table, a crosshead located on the side of the table remote from the intermediate plate, extending transversely to the guiding columns and having openings through which the guiding columns pass, means for guiding the crosshead on the guiding columns, screw means extending parallel to the guiding columns, and passing through openings in the table and in the crosshead, thrust bearing means on the base plate journalling the screw means near one end thereof, means acting from the base plate for driving the screw means, nut means threaded on the screw means and secured to the crosshead, load measuring means connected at one end to the crosshead, second grip means connected to the other end of the load measuring means, the guiding columns functioning as load bearing members in the direction of load between the base plate and the table, and the columns functioning as guiding elements resisting force components due to off-center loading between the table and the crosshead.

4. A testing machine of claim 3, in which the guiding columns are located at four corners of the table and of the crosshead, and in which the screw means extend between the guiding columns at opposite ends of the table and the crosshead.

5. A testing machine of claim 4, in which pairs of guiding columns on each end of the machine are cross connected at ends opposite from the base plate.

6. A testing machine of claim 3, in which the means for securing the guiding columns to the table comprises adjustable means including cooperating abutments positioned at a plurality of positions along the guiding columns.

References Cited

UNITED STATES PATENTS

| | | | |
|---|---|---|---|
| 2,212,085 | 8/1940 | Tate. | |
| 2,230,045 | 1/1941 | Boden | 287—52.07 |
| 2,669,868 | 2/1954 | Shneider | 73—93 |
| 2,867,460 | 1/1959 | Johnson | 27—52.07 X |
| 2,978,900 | 4/1961 | Lee | 73—93 |
| 3,055,224 | 9/1962 | Macgeorge | 73—93 X |
| 3,203,232 | 8/1965 | Lehnig | 73—93 |

OTHER REFERENCES

"Alignomatic Grips," published by Research Incorporated, Jan. 4, 1965.

RICHARD C. QUEISSER, *Primary Examiner.*

JAMES WILLIAMSON, *Assistant Examiner.*